(12) United States Patent
Chapin et al.

(10) Patent No.: US 11,297,818 B2
(45) Date of Patent: Apr. 12, 2022

(54) BAIT STATION FOR DEPLOYING PLURAL INSECT BAITS

(71) Applicant: Sterling International Inc., Spokane, WA (US)

(72) Inventors: Marc Chapin, Spokane, WA (US); Qing-He Zhang, Greenacres, WA (US); Rodney G. Schneidmiller, Greenacres, WA (US)

(73) Assignee: Sterling International Inc., Spokane, WA (US)

( * ) Notice: Subject to any disclaimer, the term of this patent is extended or adjusted under 35 U.S.C. 154(b) by 121 days.

(21) Appl. No.: 16/836,654

(22) Filed: Mar. 31, 2020

(65) Prior Publication Data
US 2020/0323190 A1    Oct. 15, 2020

Related U.S. Application Data

(60) Provisional application No. 62/833,518, filed on Apr. 12, 2019.

(51) Int. Cl.
*A01M 1/20* (2006.01)
(52) U.S. Cl.
CPC ................. *A01M 1/2011* (2013.01)
(58) Field of Classification Search
CPC .... A01M 1/2011; A01M 1/20; A01M 1/2005; A01M 1/2016; A01M 1/00
See application file for complete search history.

(56) References Cited

U.S. PATENT DOCUMENTS

| 4,065,872 A | 1/1978 | Patton |
| 4,709,504 A | 12/1987 | Andric |
| 4,837,969 A | 6/1989 | Demarest |

(Continued)

FOREIGN PATENT DOCUMENTS

| DE | 20 2004 013 880 U1 | 4/2005 |
| DE | 10 2007 055 592 A1 | 5/2009 |

(Continued)

OTHER PUBLICATIONS

"Herbal Insect Repellent," Burt's Bees, Dec. 23, 2009, <http://web.archive.org/web/20091223025921/http://global.burtsbees.com/natural-products/sun-and-outdoor-protection/herbal-insect-repellent.html> [retrieved Jan. 29, 2014], 2 pages.

(Continued)

*Primary Examiner* — Timothy D Collins
*Assistant Examiner* — Maria E Graber
(74) *Attorney, Agent, or Firm* — Christensen O'Connor Johnson Kindness PLLC

(57) ABSTRACT

An insect bait station, for example an ant bait station, for deploying a toxicant includes a housing with a body portion covered by a cover. The body portion includes first and second reservoirs. Entryways having a converging outer portion and an upright tubular portion provide insect access into the housing. The upright tubular portion extends from the converging outer portion, through a bait in the second reservoir. An entry port is provided in the tubular portion above the bait. A first bait is disposed in the first reservoir and a second bait is disposed in the second reservoir. For example, the first bait may include a protein-based food and a pesticide, and the second bait may include a sugar- or lipid-based food with or without a pesticide.

20 Claims, 5 Drawing Sheets

(56) References Cited

U.S. PATENT DOCUMENTS

| | | | | |
|---|---|---|---|---|
| 5,150,722 | A | 9/1992 | Rutherford | |
| 5,152,096 | A | 10/1992 | Rudolph | |
| 5,573,770 | A | 11/1996 | Kern | |
| 5,782,409 | A | 7/1998 | Paul | |
| 5,953,854 | A * | 9/1999 | Hyatt | A01M 1/2011 43/131 |
| 6,109,537 | A | 8/2000 | Heath | |
| 6,189,259 | B1 * | 2/2001 | Soller | A01M 1/2005 43/131 |
| 6,195,933 | B1 | 3/2001 | Woodruff | |
| 6,216,384 | B1 * | 4/2001 | Dickson | A01M 1/2005 43/131 |
| 6,272,791 | B1 | 8/2001 | Pleasants | |
| 6,288,399 | B1 | 11/2001 | Andreaco et al. | |
| 6,459,085 | B1 | 10/2002 | Chang et al. | |
| 6,528,793 | B1 | 3/2003 | Chen et al. | |
| 6,532,696 | B2 | 3/2003 | Clark, III | |
| 6,548,085 | B1 | 4/2003 | Zobitne | |
| 6,618,983 | B1 * | 9/2003 | Spragins | A01M 1/14 43/107 |
| 7,230,246 | B2 | 6/2007 | Hawman | |
| 7,393,528 | B2 | 7/2008 | Tvedten | |
| 7,420,176 | B2 | 9/2008 | Motomura et al. | |
| 7,575,765 | B1 | 8/2009 | Hughes | |
| 7,601,963 | B2 | 10/2009 | Aykac et al. | |
| 8,104,224 | B1 * | 1/2012 | Doss | A01M 1/2011 43/131 |
| D725,224 | S | 3/2015 | Zhang et al. | |
| D729,340 | S | 5/2015 | Zhang et al. | |
| D734,420 | S | 7/2015 | Zhang et al. | |
| D811,517 | S | 2/2018 | Chapin et al. | |
| D823,426 | S | 7/2018 | Chapin et al. | |
| 10,264,777 | B2 | 4/2019 | Zhang et al. | |
| 2001/0054249 | A1 * | 12/2001 | Baker | A01M 1/2005 43/133 |
| 2002/0069579 | A1 | 6/2002 | Hyatt | |
| 2005/0000147 | A1 * | 1/2005 | Westphal | A01M 1/2005 43/131 |
| 2005/0091911 | A1 | 5/2005 | Matts et al. | |
| 2005/0252074 | A1 | 11/2005 | Duston et al. | |
| 2006/0016905 | A1 | 1/2006 | Roreger | |
| 2006/0029630 | A1 | 2/2006 | Overman | |
| 2006/0165746 | A1 | 7/2006 | Markus | |
| 2007/0098750 | A1 | 5/2007 | Bessette | |
| 2007/0166342 | A1 | 7/2007 | Darling | |
| 2007/0178128 | A1 | 8/2007 | Bessette | |
| 2007/0190094 | A1 | 8/2007 | Bessette | |
| 2008/0095813 | A1 | 4/2008 | Kiec | |
| 2008/0107640 | A1 | 5/2008 | Tvedten | |
| 2008/0166415 | A1 | 7/2008 | Markus | |
| 2008/0187607 | A1 | 8/2008 | Bessette | |
| 2008/0269177 | A1 | 10/2008 | Bessette | |
| 2008/0274072 | A1 | 11/2008 | Manolas et al. | |
| 2009/0099135 | A1 | 4/2009 | Enan | |
| 2009/0232918 | A1 | 9/2009 | Enan | |
| 2010/0144888 | A1 | 6/2010 | Bessette | |
| 2010/0205850 | A1 | 8/2010 | Bernard | |
| 2010/0319239 | A1 | 12/2010 | Kirkland et al. | |
| 2014/0082994 | A1 | 3/2014 | Mayo, Jr. | |
| 2017/0118971 | A1 | 5/2017 | Hwang | |
| 2017/0196214 | A1 | 7/2017 | Lubic | |

FOREIGN PATENT DOCUMENTS

| | | |
|---|---|---|
| EP | 2 781 155 A2 | 9/2014 |
| IL | 123878 A | 3/2001 |
| JP | 2003-274834 A | 9/2003 |
| WO | 1999/052359 A1 | 10/1999 |
| WO | 00/72671 A1 | 12/2000 |
| WO | 2001/091554 A1 | 12/2001 |
| WO | 2006/072039 A1 | 7/2006 |
| WO | 2007/051814 A1 | 5/2007 |
| WO | 2009/038599 A1 | 3/2009 |
| WO | 2009/123907 A1 | 10/2009 |

OTHER PUBLICATIONS

International Search Report and Written Opinion dated Jul. 14, 2020, in corresponding Application No. PCT/US2020/025990, filed Mar. 31, 2020, 12 pages.

"Mortein Odourless Mozzie Zapper," Reckitt Benckiser, Inc., Sep. 30, 2009, <https://web.archive.org/web/20090930041517/http://www.mortein.com.au/product_odour_mozzie_zap.php> [retrieved Nov. 19, 2013], 3 pages.

Tarr Kent, L., "Aromatherapy & Isopropyl Alcohol," Livestrong.com, <http://www.livestrong.com/article/110198-aromatherapy-isopropyl-alcohol/> [retrieved Oct. 3, 2012], 4 pages.

"Types of Propellant," BAMA (British Aerosol Manufacturers' Assoc.): Aerosols and Pressure, <http://resources.schoolscience.co.uk/bama/14-16/aerosch5pg2.html> [retrieved Oct. 3, 2012], 2 pages.

* cited by examiner

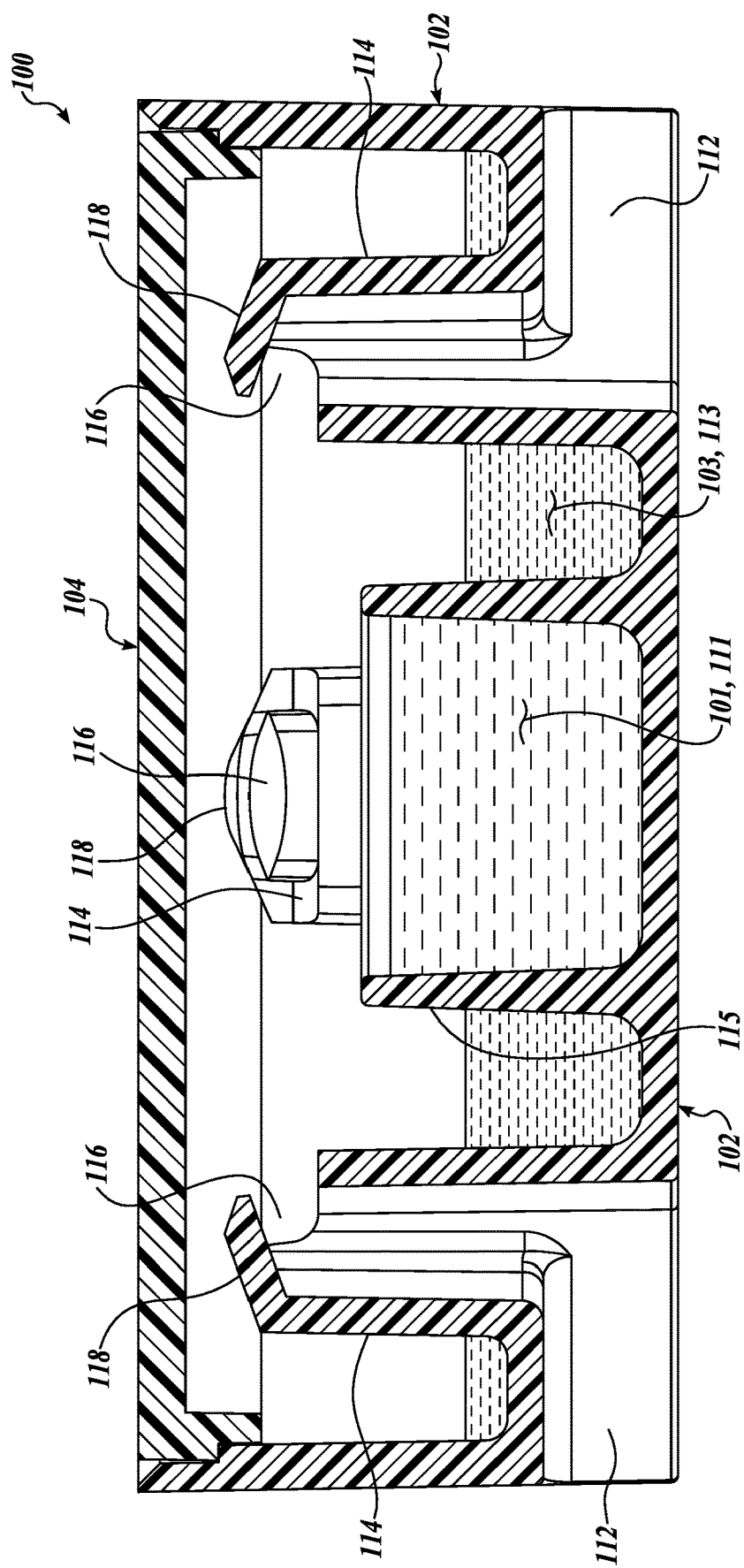

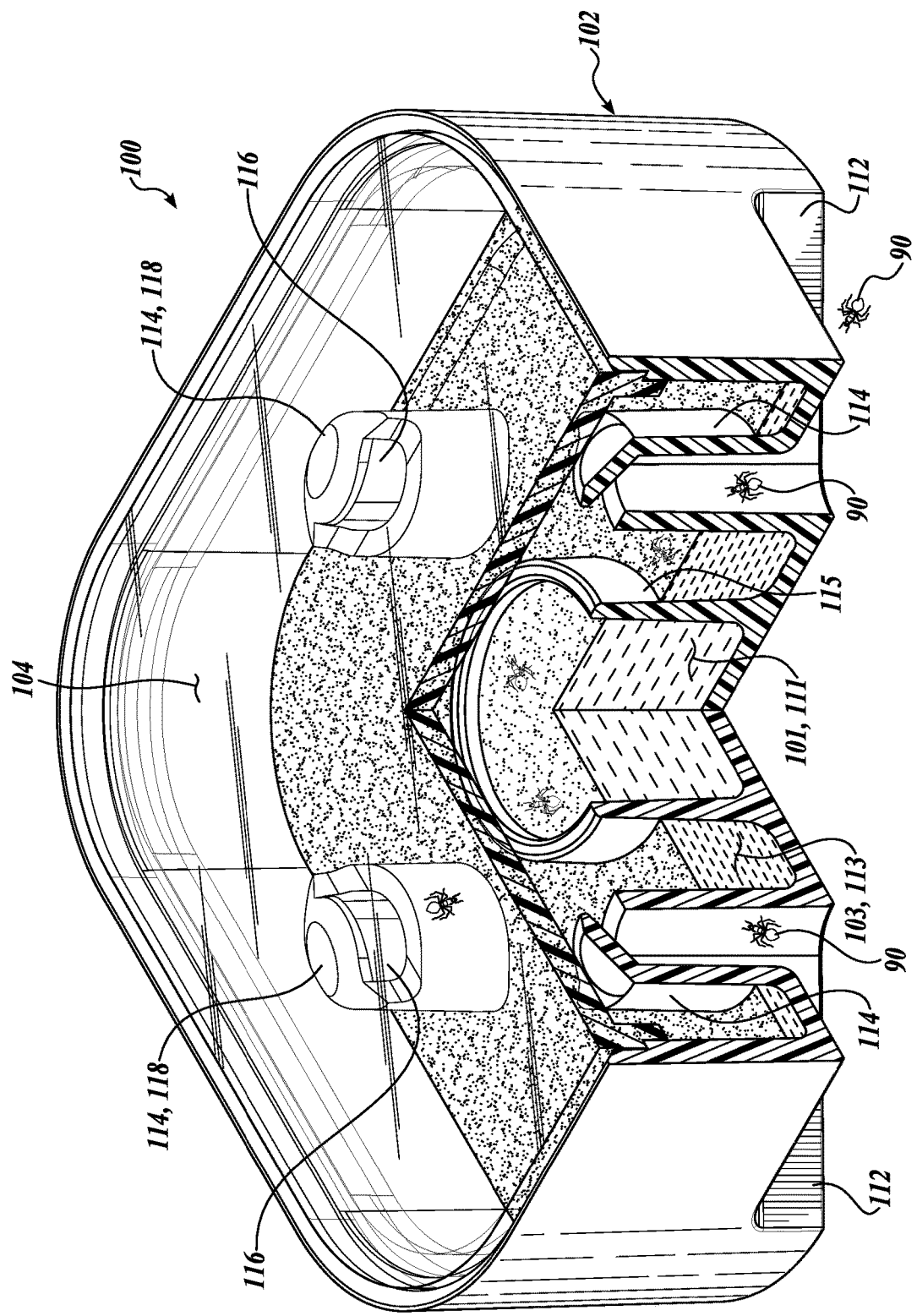

BAIT STATION FOR DEPLOYING PLURAL INSECT BAITS

CROSS-REFERENCE TO RELATED APPLICATION

This application claims the benefit of Provisional Application No. 62/833,518, filed Apr. 12, 2019. The entire disclosure of said application is hereby incorporated by reference herein.

BACKGROUND

Insect bait stations are known in the art. In a typical bait station a target insect is encouraged to retrieve a bait that contains a component that is harmful to the target insect. For example, the bait may include an insecticide that does not immediately disable the insect, such that the target insect may transport some amount of the bait to the nest. A delayed-action poison active ingredient in the bait may then be shared with the nest, which provides more effective eradication. For example, a pest control bait station is disclosed in U.S. Pat. No. 8,156,684, to Kirkland et al., and U.S. Patent Pre-Grant Application Publication No. 2014/0082994, to Mayo, Jr., both of which are hereby incorporated by reference. The bait station disclosed in Kirkland et al. comprises a multi compartment tray defining separated bait reservoirs, with raised regions providing access, and a conveyance structure from the access apertures into the reservoir. However, the device is relatively complex, and therefore expensive, and it provides only one mode for the target insect to access the bait. Current bait stations on the market for ant control, for example, are typically food-based, and may include a gel bait, a liquid bait, or a solid granular bait.

Commercial toxic baits and/or bait stations have been used in both urban and agricultural settings. There are many types of bait stations in both commercial and consumer markets for various pest insects, such as ants, cockroaches, termites, etc. They typically include an attractant (e.g., food-based proteins, carbohydrates, or lipids), a carrier, and an active insecticide ingredient. Typically, the bait formulations in containerized devices are in the form of either a thick paste or solid blocks (with no or little water content). Liquid baits, mainly the sugar-water based baits for several sugar-eating ant species are normally entrapped in closed or liquid-tight sealed containers during storage and are opened to the target insects by consumers or pest control personnel by cutting off a small part of container or peeling away the seal. Major drawbacks of liquid baits are that they are typically less effective at attracting many protein/fat eating ant species, and they are susceptible to spillage.

Gel formulations may be preferable to thick paste or solid formulations due to the relatively higher water content (40-80%) in the gel, which accommodates insect feeding preference and controls efficacy. In conventional gel-based systems, the gel is packed in syringes or squeeze tubes for direct applications in ant or cockroach infested sites such as cracks, crevices, and voids. Due to the high moister content in gels, a certain level of free water or syneresis may occur in or around gel formulations. The free waters/liquids create challenges and leaking issues for bait station designs, especially bait stations having open entrances. Current open-entrance bait station designs are not able to hold or avoid leakage/spillage of even small amounts of free liquids from the gel bait formulations during the production, storage, shipping, and display of the product, or even during the placement and relocation of the bait stations. Therefore, improvements in bait station design concepts suitable for all bait formulations, especially capable of holding/tolerating a certain level of free liquids are needed to address above-mentioned issues.

Prior art toxic baits systems for destroying or disrupting ant colonies have had only limited success. Baits have not been as effective as they could be because the baits, and bait deployment, have failed to take into account the behavioral characteristics of the target ants, and the impact that biological needs of the ant (and ant colony) will have on these behavioral characteristics.

Ants (>14,000 spp. described; at least 20,000 spp. in nature worldwide) will eat almost anything, including sugars (honeydews, nectars), proteins (live or dead insects) and lipids (soybean or peanut oil). They also require water. Some species, like the leaf-cutter ants (e.g., genera *Atta* and *Acromyrmex*), use leaves to produce fungi in their nests as a food source. Harvester ants (e.g., genus *Pogonomyrmex*) collect seeds to store for food. Some species even use aphids or scale insects, as if they were their cows, for their honeydew secretions. Some species forage by going to various fruits and flowers to collect nectar, for example, honey pot ants, whereas other species prefer lipids-rich foods, such as soybean oil or peanut oil, for example, imported fire ants.

In general, worker ants (e.g., foragers, nurses, guards) eat sugar-based foods (carbohydrates) in liquid form for energy; ant larvae eat proteins in liquid, semi-liquid or solid forms for growth; whereas queens need to have both proteinaceous foods for reproduction and some sugar for energy in liquid or semi-liquid form. In general, ant larvae can consume solid foods, but adult ants (workers, males and queens) cannot; worker ants can ingest some solid foods but cannot efficiently digest them. Even though foraging workers can transfer relatively large portions of solid protein foods (by mouthparts) or ingest smaller sized solid particles (by crop), they have a limited ability to digest bulky proteinaceous foods in the mid gut because of a combination of their narrow waist (petiole) separating the thorax from the abdomen and because they produce only very small amounts of proteases in their mid-guts. Foraging workers can ingest small solid particles (<0.5 microns), due to the size of the buccal tube that is lined with setae and serve as filters in the ant head. Particles too large to pass through this filtering mechanism remain in the infrabuccal pocket, but can later be transferred by foragers to larvae in the colony.

The larvae, especially the later instars are capable of protein digestion of these large solid protein particles (even in an undigested state) both extra-orally through high protease levels in labial gland secretions and in the mid-gut. The later instars of larvae will feed back some of the digested/liquefied proteins to workers for sharing with young larvae or queens, or the minor nutrient needs for workers. Thus, larvae are not only the passive recipients of nutrition (proteins), but they may also function as an active protein digestive organ for the colony. The younger larvae, on the other hand, eat mainly the liquefied, or at least semi-liquefied, proteins provided by workers (directly obtained from field by foragers or fed back from older larvae via workers).

Forager workers handle liquid foods much quicker and more efficiently than solid foods. Liquids, especially sugar-based liquids, are easily ingested through the worker buccal tube into the pharynx and down the esophagus to the crop and mid-gut for storage and digestion. The liquid sugar foods will be transferred to the nest for sharing with other workers, queens, and of course for their own energy needs.

Protein provides amino acids that are used predominately by larvae to grow, while carbohydrates are used mostly by workers as a substrate for energy. Larvae play an important role in protein regulation behavior; ant colonies that lack brood prefer carbohydrate-based diets, while those with brood prefer a more balanced protein-carbohydrate intake. However, too much protein can be toxic for ants. Therefore, regulating protein intake to a fixed level is a mechanism for keeping the entire colony healthy.

Carbohydrates, in contrast to protein, are equally valuable for both workers and larvae. In workers, carbohydrates fuel foraging activities and can be used to build lipid reserves, and in larvae they can enhance development when matched with dietary protein.

The insect fat body is a tissue composed of lobes suspended in the hemocoel, or primary body cavity, and bathed in the insect hemolymph. Fat body plays major roles in the life of insects. It is a dynamic tissue involved in multiple metabolic functions, including the storing and release of energy in response to the energy demands of the insect. Lipid is the main fat body component, and more than 90% of the lipid stored is triglyceride (TAG), which can be synthesized from dietary carbohydrates, fatty acids, or proteins. The key function of fat body is to store and release energy in response to the energy demands of ants. Only a few ant species, such as fire ants, are attracted to and actively forage the lipid-rich food (or baits, such as granules of defatted corn grit impregnated with soybean oil). Most ant species do not actively forage lipids, but they are able to convert sugars (carbohydrates) and/or proteins to lipid.

The decision of a forager to retrieve an encountered food item is influenced by both internal and external factors, occurring at both the individual and colony level. At the individual level, a worker's current physiological condition (e.g., endogenous stores of lipids) may prompt foraging behavior. The attractiveness of an encountered food item may be affected by the perceived relative availability and/or abundance or scarcity of food items. At the colony level, feedback related to larval nutritional demands (especially for protein), transmitted through a 'chain-of-demand' between brood, nurse workers, and foragers, and created through colony member food sharing is likely to be important. However, the strength of both internal and external cues directing worker foraging decisions can vary temporally, compounding the task of nutrient retrieval especially in the face of potential resource shortfalls (e.g., seasonal variation in resource availability). Potential determinants guiding the collection of resources by workers might include, but are not limited to, resource preference of different colony members, temporal shifts in resource availability, worker preference, and food distribution among colony members.

Baits work by taking advantage of insect biology and behavior such as social grooming and trophallaxis (food sharing). For example, once an attractive bait is discovered, foraging ants will collect bait and transport it back to the colony. They may communicate the location and quality of the food sources (baits) to other foragers in the colony via trail pheromone; the other workers follow the pheromone trail(s) to the newly discovered bait. The workers retrieve the bait and return with the bait to the colony, also re-enforcing the pheromone trail laid down by the first group of foragers. In a short period of time many workers will follow the foraging trail, quickly arriving at the bait source, and transferring the bait back to the nest for sharing with other members of the colony.

The brood, especially late instars, may be important in the digestion of solid bait particles into a liquefied form that can be transferred to workers and reproductives in the colony. The amount of brood in the colonies could be responsible for the foraging preference and behavior of the worker ants. Fourth instar larvae do most of the protein digestion in the ant colony and their presence in a colony can change ant foraging preference to proteinaceous materials.

It is through food sharing that a toxicant in the bait can be transferred to the rest of the colony. For example, sodium borate (also known as borax) is a known ant toxicant, but is believed to have low toxicity to humans and other mammals. Because the bait is picked up directly by the ant forager workers and is later shared within the colony, relatively low amounts of the toxicant can be used in targeting a pest ant population. Ant foragers that first pick up or consume the bait, share the toxicant within the bait with other workers, queen tenders, and larvae. Typically, after 3-4 days the toxicant will reach the queen, which affects reproduction in the colony. Even if the queen dies, eggs may hatch, larvae may pupate and develop into workers. The final control of a large ant colony may take 1-5 months.

A bait station with multiple compartments/chambers/reservoirs with different food bait types (e.g., sugar, protein, or lipid) could meet all the variable nutritional demands of the colony at both the individual and the colony levels throughout the season. The presence of all potential nutrients in separated forms in the bait station should increase the likelihood that foraging insects, such as ants, will find what they need, and communicate the location and quality of the food sources (baits) to other foragers via pheromones. Such a bait station design would not only significantly increase ant foraging activities and the overall nutrient acquisition efficacy, but more importantly will increase and maximize the transfer and distribution of a lethal dose of insecticide with delayed toxicity to all members of the colony, especially to larvae and queen(s) through the protein bait intake, before foraging and food sharing activities in the colony are shut down due to the toxic active ingredient in the baits; and ultimately kill all castes within the nest (workers, larvae, males, and queens) for elimination of the ant colony.

An optimal bait station design would take into account the behavioral characteristics of the target insect, and the impact that biological needs of the insect (and insect colony) will have on these behavioral characteristics. For example, multiple bottom entrances in an insect bait station may be designed to create an ideal plume structure for attractive volatile semiochemicals from the bait formulations near the ground in multiple directions for effectively attracting the forager ants. The optimal locations and placements of inner openings of multiple entrance tubes in the bait station would minimize leakage, spillage and splash of certain level of free water/liquid or syneresis from attractive gel or thin paste formulations. These locations should not be too close to bait surfaces and/or to the inner surface of the top lids.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An insect bait station, for example an ant bait station, is configured for deploying a plurality of baits, including at least one bait contains a toxicant to the target insect. The bait station includes a housing having a body and a cover closing an upper end of the body, defining an enclosure. The enclosure has a first reservoir, a second reservoir, and at least one entryway into the housing. The entryway(s) include a lower recess portion and a tubular portion that extends from the lower recess portion into the housing. The tubular portion has an entry port into the housing. A first bait is disposed in the first reservoir and a second bait disposed in the second reservoir. The tubular portion extend through the second bait such that the entry port is disposed above the second bait.

In an embodiment the tubular portion includes a splash guard above the entry port.

In an embodiment the second reservoir surrounds the first reservoir.

In an embodiment the lower recess portion of the entryway defines a channel that converges towards the tubular portion.

In an embodiment the entry port opens towards a center of the bait station.

In an embodiment the lower recess portion of the entryway(s) comprises an external surface of the housing.

In an embodiment the entryway(s) comprise at least four entryways, for example, four entryways disposed on four different sides of the body.

In an embodiment at least a portion of the cover is transparent.

In an embodiment the first bait is one of a sugar-based bait, a protein-based bait, and a lipid-based bait, and the second bait is a different one of a sugar-based bait, a protein-based bait, and a lipid-based bait.

In an embodiment the first bait is one of a paste and a gel, and the second bait one of a paste and a gel.

An ant bait station includes an enclosure defining a first reservoir, a second reservoir, and a plurality of entryways into the enclosure. Each entryway has an external recess formed in a lower portion of the enclosure and a tubular portion defining a flow path from the external recess into the enclosure. The tubular portions include an entry port opening into the enclosure and a distal splash guard. A first bait is disposed in the first reservoir and a second bait disposed in the second reservoir. The tubular portion of each of the plurality of entryways extends through the second bait such that the entry port is disposed above the second bait.

In an embodiment the second reservoir surrounds the first reservoir.

In an embodiment the external recess of each entryway defines a channel that converges towards the tubular portion.

In an embodiment the entry port opens towards a center of the bait station.

In an embodiment the external recess of each entryway is formed in part as an external surface of the housing.

In an embodiment the plurality of entryways are four entryways disposed on four different sides of the enclosure.

In an embodiment the enclosure has a transparent cover.

In an embodiment the first bait is one of a sugar-based bait, a protein-based bait, and a lipid-based bait, and the second bait is a different one of a sugar-based bait, a protein-based bait, and a lipid-based bait.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a sectional view of the insect bait station shown in FIG. 1, through section 4-4 indicated in FIG. 3; and FIG. 5 is a quarter-sectional view of the insect bait station shown in FIG. 1.

DETAILED DESCRIPTION

Figure 1:
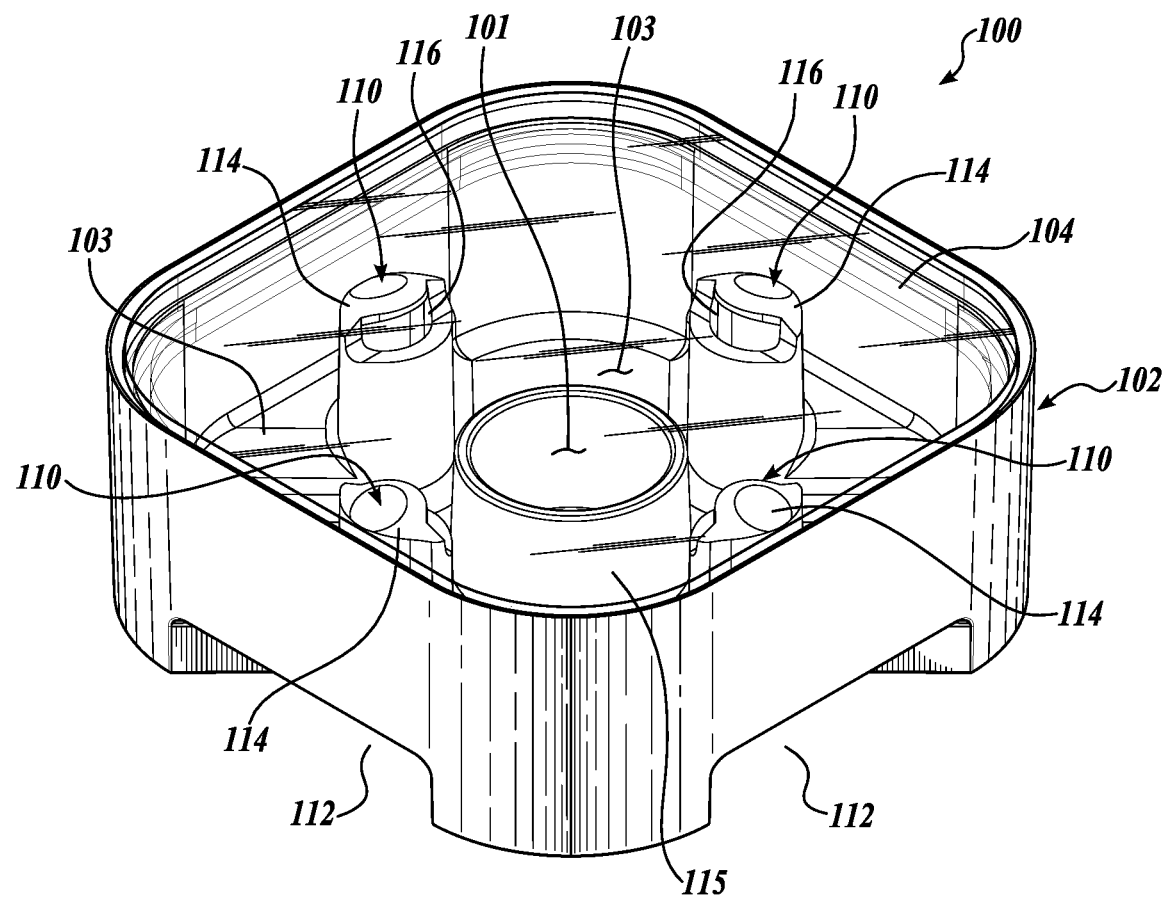
FIG. 1 is an upper perspective view of an insect bait station in accordance with the present invention, having an optionally transparent cover.
Figure 2:
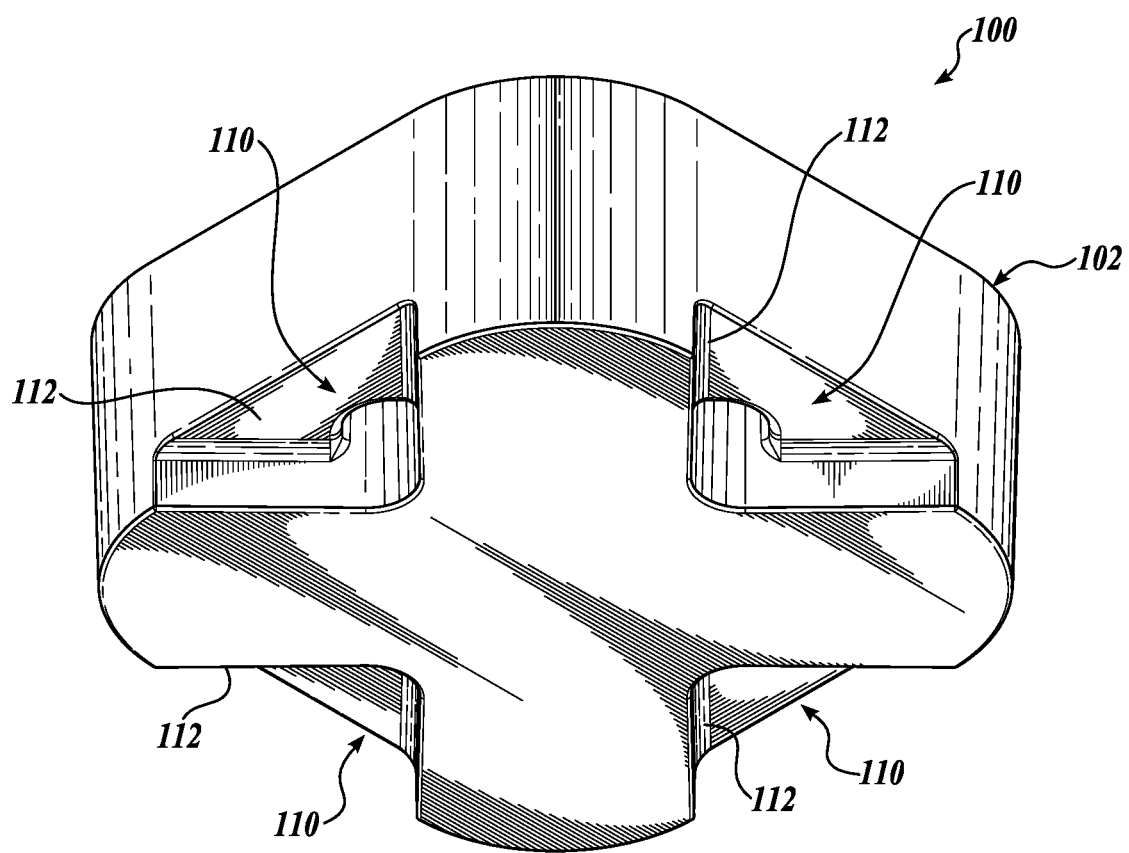
FIG. 2 is a lower perspective view of the insect bait station shown in FIG. 1.
Figure 3:
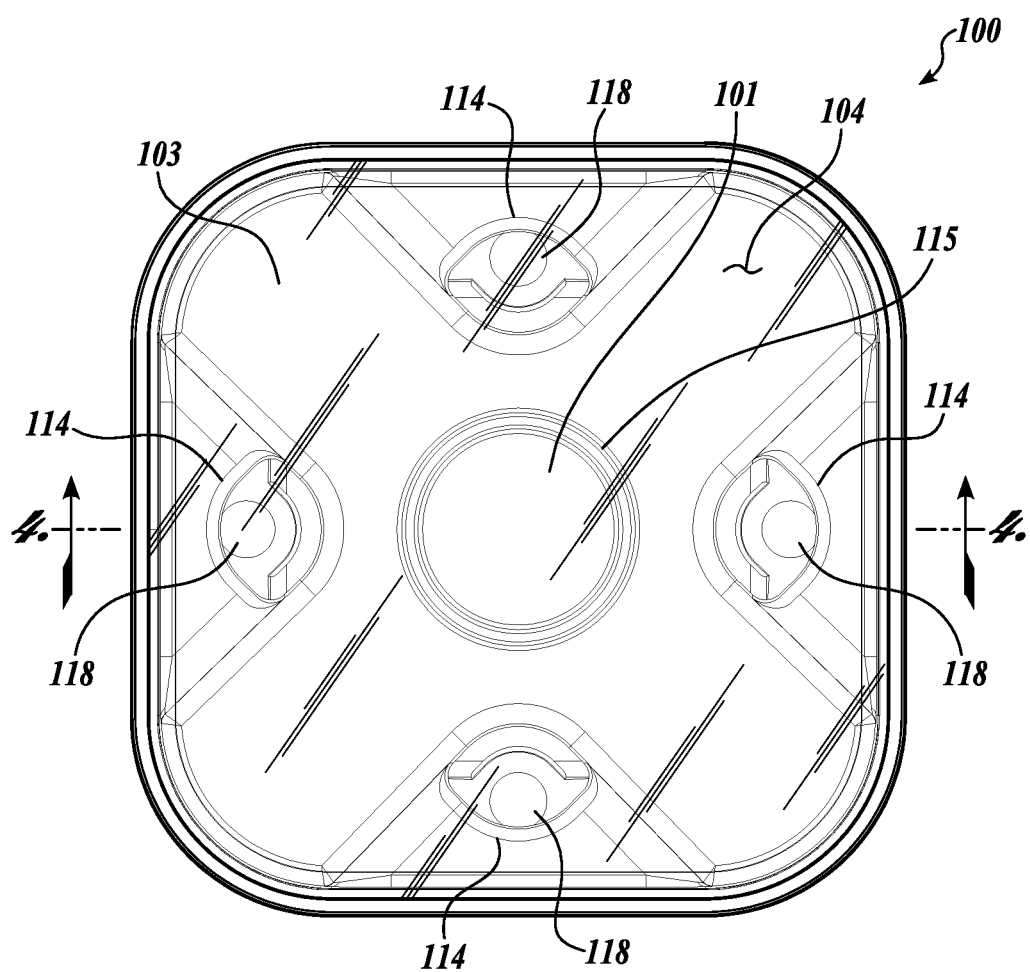
FIG. 3 is a plan view of the insect bait station shown in FIG. 1.

FIG. 1 is an upper perspective view of a crawling insect bait station 100 in accordance with the present invention. Although the bait station 100 is sometimes described with reference to a bait station containing an ant bait, it will be appreciated that the bait station 100 may alternatively be used to target other crawling arthropods. FIG. 2 is a lower perspective view of the bait station 100, and FIG. 3 is a upper plan view of the bait station 100. The bait station 100 defines a first bait reservoir 101, centrally located in this embodiment, and a second bait reservoir 103 surrounding the first bait reservoir 101. The bait station 100 may be configured to deploy two different baits to allow synergistic advantages in eradicating the target pests.

Refer also to the sectional view of the bait station 100 shown in FIG. 4 (through section 4-4 indicated in FIG. 3), which shows the bait station 100 configured for deployment, with a first bait 111 in the first reservoir 101 and a second bait 113 in the second reservoir 103. In a current embodiment the first bait 111 is of a different type than the second bait 113. For example, the first bait 111 may be a protein type bait and the second bait 113 may be a lipid type or carbohydrate (e.g., sugar) type bait. More generally, the first bait 111 may be a sugar-based, protein-based, or lipid-based bait, and the second bait 113 may be a different one of a sugar-based, protein-based, or lipid-based bait.

In this embodiment the first reservoir 101 is separated from the second reservoir 103 by a tubular wall 115, and configured such that both the first bait 111 and the second bait 113 are accessible to any crawling insect 90 that has entered the bait station 100 (see, FIG. 5). Therefore, foraging insects 90 in search of either type of bait 111 or 113 will be able to access and retrieve either the first bait 111 or the second bait 113 (or both the first and second bait 111, 113) upon entering the bait station 100. In other embodiments the bait station may include more than two reservoirs and/or more than two bait types, for example three bait reservoirs, each reservoir containing one of a sugar-based bait, a protein-based bait, and a lipid-based bait, and wherein all of the retained baits are disposed in separate reservoirs, and all of the retained baits are accessible to any target insect 90 that enters the bait station 100.

The bait station 100 has a main body portion 102 defining the centrally-located first reservoir 101 and the peripheral second reservoir 103. Although in the current embodiment the second reservoir 103 completely surrounds the first reservoir 101, which provides some advantages as discussed below, other embodiments are contemplated. For example, the first and second reservoirs may be disposed side by side or the second reservoir may abut three sides of the first reservoir.

A cover 104 closes a top end of the body portion 102. Optionally, the cover 104 may be transparent such that ambient light may illuminate the interior of the bait station 100. The transparent cover 104 allows a user to monitor for the presence of target (or non-target) insects in the bait station 100, for example, to assess the effectiveness of the baits 111, 113 and/or to identify problems such as depletion of one or both of the baits 111, 113. In some embodiments the transparent cover 104 may be only partially transparent, for example, configured with one or more lens portions (not shown) to facilitate monitoring the bait station 100. In other embodiments the cover 104 is opaque, translucent, or a combination thereof. It is contemplated that the cover 104 may not be planar. For example, a cover may be domed, concave, or have both convex and concave portions. The cover 104 may be provided with decorative or informative indicia and/or texturing. In a current embodiment the cover 104 is heat or ultrasonically sealed to the main body portion 102. In other embodiments the cover 104 is press fit and/or adhesively attached to the body portion 102. In other embodiments the cover is removable, for example, with a threaded or friction-fit engagement.

The body portion 102 includes a plurality of entryways 110, in this embodiment four spaced-apart entryways 110, that each provide independent access to the baits 111, 113. Each entryway 110 accesses a different location within the bait station 100. More or fewer entryways 110 may be provided.

The entryways 110 each include an outer section 112 that leads to an upright tubular section 114. As seen most clearly in FIG. 2, the outer sections 112 of the entryways 110 in this embodiment define a converging lower recess in the body portion 102 of the bait station 100. In the currently preferred embodiment, one converging outer section 112 is provided on each side of the body portion 102. Each converging section 112 narrows toward the corresponding upright tubular section 114 (see FIG. 4). The tubular sections 114 extend from the converging section 112 into the bait station 100. The tubular sections 114 extend upwardly into, and substantially through, the second reservoir 103. The tubular sections 114 extend through the second bait 113 in the second reservoir 103. Each of the tubular sections 114 includes an opening or entry port 116 located above the second bait 113. The entry ports 116 of the entrance tubes 114 are preferably sized and shaped to avoid or reduce leakage, spillage and/or splashing of free liquids that may accumulate in the trap 100. For example, in the current embodiments the entry ports 116 all open towards a center of the bait station 100, i.e., facing the first reservoir 101, as seen most clearly in FIG. 3. The ports 116 are located above the baits 111, 113 and spaced downward from the inner surface of the cover 104.

Although in this embodiment the tubular sections 114 are oriented vertically, it is contemplated that the tubular sections may be disposed at an angle, for example, to facilitate target insect ingress and egress from the bait station 100. Each of the tubular sections 114 further includes a cover or splash guard 118 at a distal end, generally defining and overlying the corresponding port 116. As discussed above, some bait formulations, for example, gel-based bait formulations, may produce small amounts of liquid, depending on environmental conditions it has encountered. In testing, the cover or splash guards 118 prevent or deter any accumulated fluids inside the bait station 100 from inadvertently escaping from the bait station 100, for example during placement, relocation, or disposing of the bait station 100. For example, the ports 116 and splash guards 118 are effective to retain free liquid accumulations inside the bait stations 100 equivalent to 20-25% of total water content in the gel formulations, without leaking/spilling during aggressive drop/shaking tests.

Referring again to the sectional view in FIGS. 4 and 5, the converging outer sections 112 of the entryways 110 provide a large entry that guides the target insects 90 to the corresponding upright tubular section 114 to enter the bait station 100. It will be appreciated that the entryways 110 define an open flow path that allows pheromones or other semiochemicals in the baits 111, 113 to be released from the trap 100 to attract target insects 90, and will generally increase in concentration in the entryway converging section 112, approaching the tubular section 114, thereby improving the efficacy of the bait station 100 in attracting the target insect 90. The plurality of entryways 110 provide independent paths for the target insects 90. Higher concentrations of the attractant in the converging outer channel 112 and tubular upright channel 114 urge the target insects 90 near the bait station 100 to enter the bait station 100 and to engage the plural baits 111, 113. In contrast to top or side openings, the multiple bottom entrances create better plume structures of attractive volatile semiochemicals from the bait 111, 113 formulations near or on the ground at multiple directions for effectively attracting the forager ants.

One or both of the baits 111, 113 contain a toxicant or component harmful to the target ant nest, for example, a delayed-action poison active ingredient, as are known in the art (and discussed above), that the forager worker ants acquire and bring back to the ant colony.

For example, in a current embodiment the first bait 111 (in the first reservoir 101) is a protein paste containing a toxicant and the second bait 113 in the second reservoir 103 contains a gel-type sugar bait 113 which may also include a toxicant, which may be different, or the same as, the toxicant in the first bait 111.

As seen most clearly in FIG. 5, in this embodiment target insects 90 attracted into the bait station 100 must traverse the second bait 113 to access the first bait 111. Therefore, target insects 90 that are attracted to the first bait 111 may desirably acquire, inadvertently or otherwise, some of the second bait 113, and transport the second bait 113 back to its nest. In some embodiments the first bait 111 may not contain a toxicant to the target insect 90 but may be very effective as an attractant. In the course of acquiring the first bait 111, however, the target insect 90 inadvertently acquires the second bait 113 containing the toxicant and transports it to the nest.

While illustrative embodiments have been illustrated and described, it will be appreciated that various changes can be made therein without departing from the spirit and scope of the invention.

The embodiments of the invention in which an exclusive property or privilege is claimed are defined as follows:

1. An insect bait station configured for deploying a plurality of baits, wherein at least one of the plurality of baits is a toxicant-containing insect bait, the bait station comprising:

a housing comprising a body portion and a cover closing an upper end of the body portion, the body portion comprising a first reservoir, a second reservoir, and at least one entryway defining a channel into the housing;

wherein the at least one entryway comprises a lower recess portion and a tubular portion extending from the lower recess portion into the housing, the tubular portion further comprising an entry port from the tubular portion into the housing;

a first bait disposed in the first reservoir and a second bait disposed in the second reservoir;

wherein the tubular portion extends upwardly through the second bait such that the entry port is disposed directly over the second bait such that insects entering the bait station from the at least one entryway must engage the second bait to access the first bait.

2. The insect bait station of claim 1, wherein the tubular portion further comprises a splash guard disposed above the entry port.

3. The insect bait station of claim 1, wherein the second reservoir surrounds the first reservoir.

4. The insect bait station of claim 1, wherein the lower recess portion of the entryway defines a channel that converges towards the tubular portion.

5. The insect bait station of claim 1, wherein the entry port opens towards a center of the bait station.

6. The insect bait station of claim 1, wherein the lower recess portion of the at least one entryway comprises an external surface of the housing.

7. The insect bait station of claim 1, wherein the at least one entryway comprises at least four entryways.

8. The insect bait station of claim 7, wherein the at least four entryways are disposed on four different sides of the body portion.

9. The insect bait station of claim 1, wherein at least a portion of the cover is transparent.

10. The insect bait station of claim 1, wherein the first bait comprises one of a sugar-based bait, a protein-based bait, and a lipid-based bait, and the second bait comprises a different one of a sugar-based bait, a protein-based bait, and a lipid-based bait.

11. The insect bait station of claim 1, wherein the first bait comprises one of a paste and a gel, and the second bait comprises one of a paste and a gel.

12. An ant bait station comprising:
an enclosure comprising a first reservoir, a second reservoir, and a plurality of entryways into the enclosure, each entryway comprising an external recess formed in a lower portion of the enclosure and a tubular portion defining a flow path from the external recess into the enclosure, each tubular portion comprising an entry port opening into the enclosure and a distal splash guard;
a first bait disposed in the first reservoir and a second bait disposed in the second reservoir;
wherein the tubular portion of each of the plurality of entryways extends through the second bait such that the entry port is disposed directly over the second bait such that insects entering the bait station from any of the plurality of entryways must engage the second bait to access the first bait.

13. The ant bait station of claim 12, wherein the second reservoir surrounds the first reservoir.

14. The ant bait station of claim 12, wherein the external recess of each entryway defines a channel that converges towards the tubular portion.

15. The ant bait station of claim 12, wherein the entry port opens towards a center of the bait station.

16. The ant bait station of claim 12, wherein the external recess of each entryway comprises an external surface of the housing.

17. The ant bait station of claim 12, wherein the plurality of entryways comprises four entryways.

18. The ant bait station of claim 17, wherein the four entryways are disposed on four different sides of the enclosure.

19. The ant bait station of claim 12, wherein enclosure comprises a transparent cover.

20. The ant bait station of claim 12, wherein the first bait comprises one of a sugar-based bait, a protein-based bait, and a lipid-based bait, and the second bait comprises a different one of a sugar-based bait, a protein-based bait, and a lipid-based bait.

\* \* \* \* \*

UNITED STATES PATENT AND TRADEMARK OFFICE
CERTIFICATE OF CORRECTION

PATENT NO.          : 11,297,818 B2
APPLICATION NO.     : 16/836654
DATED               : April 12, 2022
INVENTOR(S)         : M. Chapin et al.

It is certified that error appears in the above-identified patent and that said Letters Patent is hereby corrected as shown below:

In the Claims

| Column | Line | |
|--------|------|---|
| 10 | 28 | change "wherein enclosure" to -- wherein the enclosure -- |

Signed and Sealed this
Twenty-eighth Day of March, 2023

Katherine Kelly Vidal
Director of the United States Patent and Trademark Office